United States Patent
Murakami et al.

(10) Patent No.: US 8,506,184 B2
(45) Date of Patent: Aug. 13, 2013

(54) SHUTTER APPARATUS, IMAGE SENSING APPARATUS, AND SHUTTER CONTROL METHOD

(75) Inventors: Taro Murakami, Tokyo (JP); Hiroyuki Takahashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 54 days.

(21) Appl. No.: 13/167,435

(22) Filed: Jun. 23, 2011

(65) Prior Publication Data

US 2012/0020657 A1   Jan. 26, 2012

(30) Foreign Application Priority Data

Jul. 21, 2010   (JP) ................. 2010-164353

(51) Int. Cl.
*G03B 9/12*   (2006.01)
*G03B 9/24*   (2006.01)

(52) U.S. Cl.
USPC ........................ 396/450; 396/490; 348/363

(58) Field of Classification Search
USPC ............... 396/449–451, 467, 485, 490, 495; 348/363, 367
See application file for complete search history.

(56) References Cited

U.S. PATENT DOCUMENTS

| | | | | |
|---|---|---|---|---|
| 5,953,062 A * | 9/1999 | Sugimori et al. | ............. | 348/364 |
| 6,343,881 B1 * | 2/2002 | Yaginuma | ............. | 396/449 |
| 6,370,336 B1 * | 4/2002 | Nishinou et al. | ............. | 396/277 |
| 6,585,429 B2 * | 7/2003 | Yaginuma et al. | ............. | 396/458 |
| 6,655,859 B2 * | 12/2003 | Kamata | ............. | 396/449 |
| 8,047,733 B2 * | 11/2011 | Numnual et al. | ............. | 396/493 |

FOREIGN PATENT DOCUMENTS

JP   2001-337361   12/2001

* cited by examiner

*Primary Examiner* — Clayton E Laballe
*Assistant Examiner* — Leon W Rhodes, Jr.
(74) *Attorney, Agent, or Firm* — Cowan, Liebowitz & Latman, P.C.

(57) ABSTRACT

A shutter apparatus mounted in an image sensing apparatus, the shutter apparatus comprising: a blade member configured to open/close an opening through which light from an object passes, and control an aperture area of the opening; and a driving unit capable of first and second driving controls, the first driving control driving the blade member to serve as a stop, and the second driving control driving the blade member to serve as a shutter, wherein when the object is captured by an image sensor, the driving unit temporarily drives the blade member in an opening direction from a first position, to which the blade member is driven in a closing direction to serve as a stop, and then activates the blade member to a fully closing position.

8 Claims, 9 Drawing Sheets

| STEP | F-NUMBER | PHASE | STATUS | |
|---|---|---|---|---|
| 0 | 2.8 | 2 | A / B | OPENING STOPPER |
| 1 | 2.8 | 1 | / B | OPEN |
| 2 | 3.5 | 2 | / A / B | |
| 3 | 4 | 1 | / A | |
| 4 | 5.6 | 2 | / AB | |
| 5 | 8 | 1 | B | |
| 6 | 11 | 2 | AB | |
| 7 | | 1 | A | FULLY CLOSED |
| 8 | | 2 | A / B | CLOSING STOPPER |
| 9 | | 1 | / B | VIRTUAL POSITION |
| 10 | | 2 | / A / B | VIRTUAL POSITION |

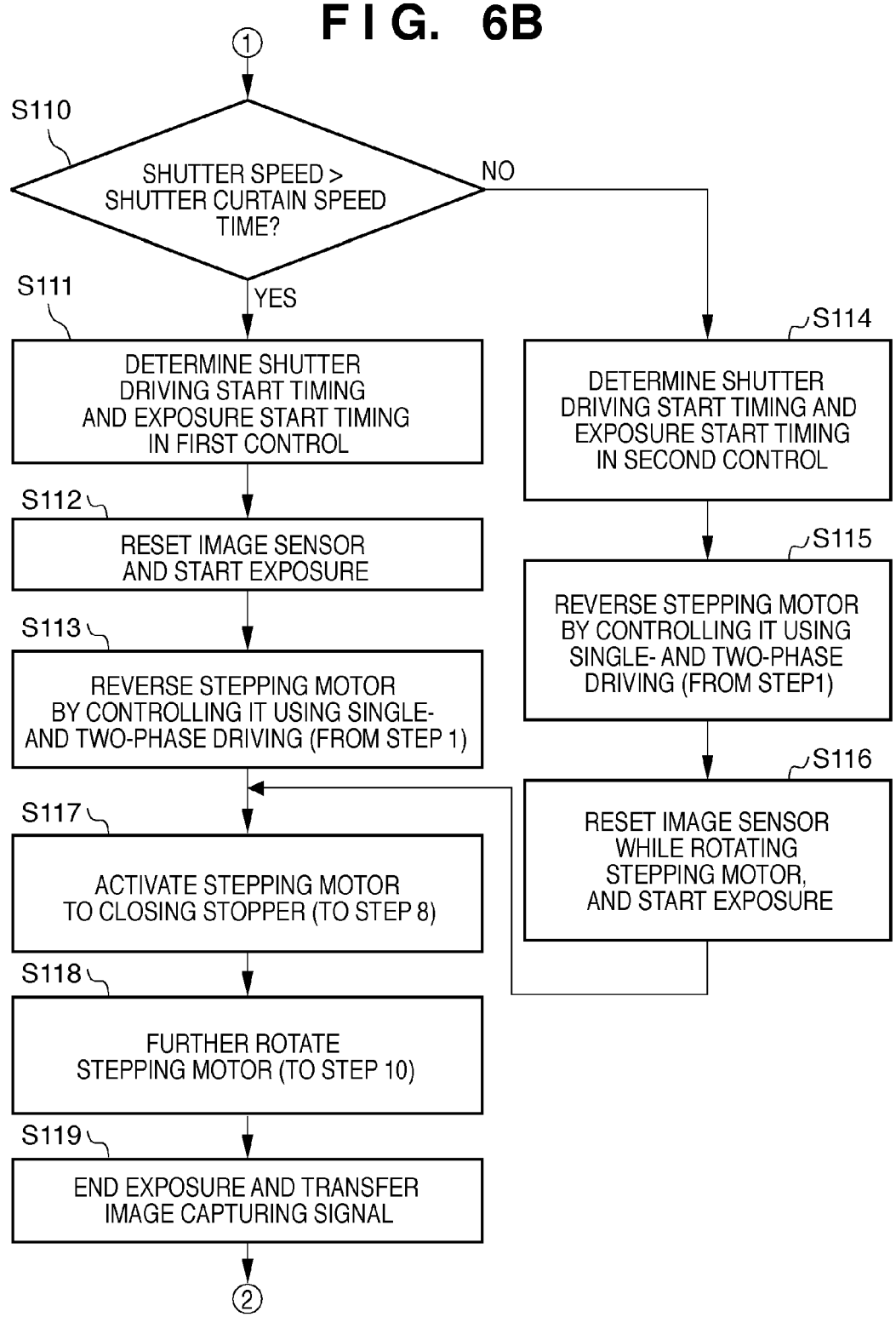

SHUTTER APPARATUS, IMAGE SENSING APPARATUS, AND SHUTTER CONTROL METHOD

BACKGROUND OF THE INVENTION

1. Field of the Invention

The present invention relates to a shutter apparatus, an image sensing apparatus, and a shutter control method.

2. Description of the Related Art

In a conventional shutter apparatus which is equipped with a stop function and mounted in a silver halide camera, the shutter is released by an operation where a blade member is opened to the degree that an F-number corresponding to the curtain speed (the driving speed of the blade member) is obtained, and immediately closing the blade member. Exposure starts as the blade member starts to open, and the driving direction of the blade member is reversed from the opening direction to the closing direction the moment a predetermined F-number is obtained (see FIG. 8B).

On the other hand, an image sensing apparatus such as a digital camera can shoot an image simply by resetting the charge stored on an image sensor (reset scanning) while the image sensor is exposed, and starting charge storage to move the blade member in the closing direction when it is kept open, without reciprocally moving it.

However, if the time delay from when an instruction to perform the closing operation of the blade member is issued until this closing operation actually starts is relatively long, it is difficult to increase the shutter speed using an arrangement that performs reset scanning with reference to the instruction to perform the closing operation of the blade member.

Japanese Patent Laid-Open No. 2001-337361 describes a technique of detecting, by a sensor, the closing operation of a shutter blade in a shutter apparatus of a digital camera, and setting the exposure start timing in correspondence with the exposure time based on photometric data using the time point, at which this closing operation is detected, as a starting point (see FIG. 8A). The use of the technique described in Japanese Patent Laid-Open No. 2001-337361 allows an increase in shutter speed even if the delay time from when an instruction to perform the closing operation of the blade member is issued until this closing operation actually starts is relatively long.

Unfortunately, the technique described in Japanese Patent Laid-Open No. 2001-337361 mentioned above requires a sensor which detects the closing operation of the shutter blade, separately from a shutter mechanism or a shutter driving mechanism.

SUMMARY OF THE INVENTION

The present invention has been made in consideration of the aforementioned problems, and realizes a shutter apparatus, image sensing apparatus, and shutter control method that can increase the shutter speed without using a sensor which detects the closing operation of a blade member.

In order to solve the aforementioned problems, the present invention provides a shutter apparatus mounted in an image sensing apparatus, the shutter apparatus comprising: a blade member configured to open/close an opening through which light from an object passes, and control an aperture area of the opening; and a driving unit capable of first and second driving controls, wherein the first driving control drives the blade member to serve as a stop, and the second driving control drives the blade member to serve as a shutter, wherein when the object is captured by an image sensor, the driving unit temporarily drives the blade member in an opening direction from a first position, to which the blade member is driven in a closing direction to serve as a stop, and then activates the blade member to a fully closing position.

In order to solve the aforementioned problems, the present invention provides an image sensing apparatus comprising: an image sensing unit; a blade member configured to open/close an opening through which light that enters the image sensing unit passes, and control an aperture area of the opening; a driving unit capable of first and second driving controls, wherein the first driving control drives the blade member to serve as a stop, and the second driving control drives the blade member to serve as a shutter; and a control unit configured to control the driving unit and the image sensing unit, wherein when an object is captured by the image sensing unit, the control unit starts exposure of the image sensing unit during a period from when the blade member starts to be driven in a closing direction after temporarily driving the blade member in an opening direction from a first position to which the blade member is driven in the closing direction to serve as a stop until the blade member reaches a fully closing position.

In order to solve the aforementioned problems, the present invention provides a shutter control method for a shutter apparatus including a blade member configured to open/close an opening through which light from an object passes, and control an aperture area of the opening, and a driving unit capable of first and second driving controls, wherein the first driving control drives the blade member to serve as a stop, and the second driving control drives the blade member to serve as a shutter, the method comprising: when the object is captured by an image sensor, temporarily driving the blade member in an opening direction from a first position, to which the blade member is driven in a closing direction to serve as a stop, and then activating the blade member to a fully closing position.

According to the present invention, it is possible to increase the shutter speed without using a sensor which detects the closing operation of a blade member.

Further features of the present invention will become apparent from the following description of exemplary embodiments with reference to the attached drawings.

BRIEF DESCRIPTION OF THE DRAWINGS

FIGS. 6A and 6B are flowcharts showing the shooting operation of the image sensing apparatus in the embodiment;

DESCRIPTION OF THE EMBODIMENTS

Figure 1:
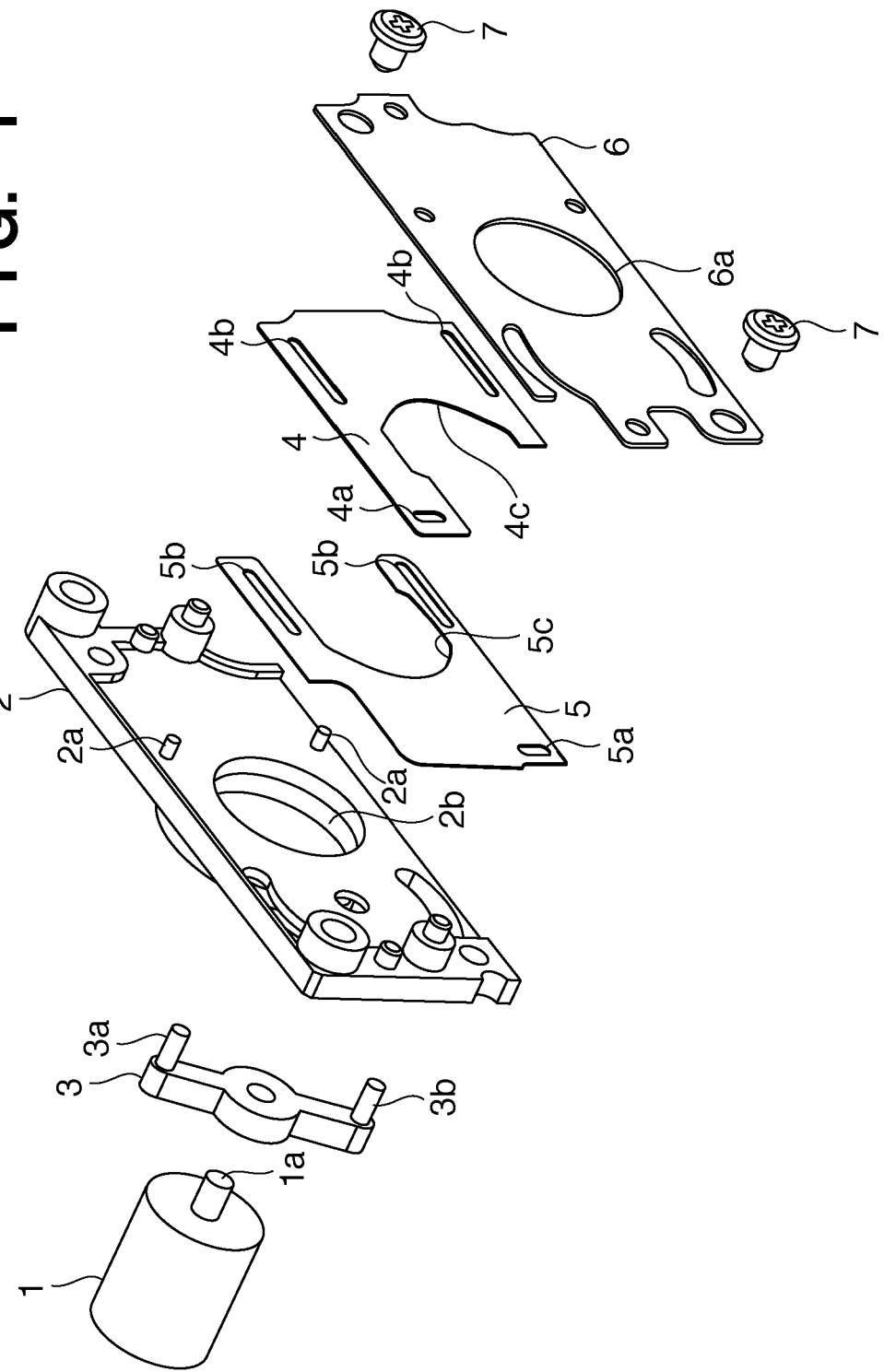
FIG. 1 is an exploded perspective view of a shutter apparatus in an embodiment of the present invention.

Embodiments of the present invention will be described in detail below with reference to the accompanying drawings.

The following embodiments are merely examples for practicing the present invention. The embodiments should be properly modified or changed depending on various conditions and the structure of an apparatus to which the present invention is applied. The present invention should not be limited to the following embodiments. Parts of the respective embodiments to be described later may be properly combined.

[Apparatus Arrangement]

The arrangement of a shutter apparatus (to be also referred to as a shutter with a stop hereinafter) which is equipped with a stop function and mounted in an image sensing apparatus in an embodiment of the present invention will be described first with reference to FIGS. 1 to 3A and 3B.

The shutter with a stop in the embodiment includes blade members 4 and 5 which control the area (aperture area) of an opening region through which light from an object passes. While the blade members 4 and 5 are mounted in the image sensing apparatus, they control the aperture area of the opening region through which light that enters an image sensor of the image sensing apparatus passes. The opening/closing operation of the blade members 4 and 5 can be used in first and driving controls. The first driving control drives the blade members 4 and 5 to serve as a stop which controls the amount of incident light, and the second driving control drives blade members 4 and 5 to serve as a shutter which controls the exposure time.

Referring to FIGS. 1 to 3A and 3B, reference numeral 1 denotes a stepping motor; 2, a foundation plate; and 3, an arm. The arm 3 is attached to a driving shaft 1a of the stepping motor 1, and swings in response to the rotation operation of the stepping motor 1. The foundation plate 2 has its one surface on which the stepping motor 1 is fixed, and its other surface which supports the two blade members 4 and 5. Guide shafts 2a projecting from the other surface of the foundation plate 2 engage with elongated holes 4b and 5b which are formed in the blade members 4 and 5, respectively, thereby guiding the blade members 4 and 5 to rectilinearly move in directions to come closer to or away from each other along the elongated holes 4b and 5b, respectively.

Reference numeral 6 denotes a cover member which is attached to the other surface of the foundation plate 2 by screws 7, and accommodates and seals the blade members 4 and 5 between it and the foundation plate 2. An opening 6a, which determines the full-aperture diameter (maximum aperture diameter) of the stop, is formed in the cover member 6. Shafts 3a and 3b projecting from the two ends of the arm 3 are fitted in holes 4a and 5a formed in the two blade members 4 and 5, respectively, through arcuated holes formed in the foundation plate 2. When the arm 3 swings in response to rotation of the driving shaft 1a of the stepping motor 1, the shafts 3a and 3b push or pull the holes 4a and 5a, respectively, so the two blade members 4 and 5 slide in opposite directions on the same straight line. Thus, the maximum aperture diameter defined by the opening 6a in the cover member 6 is shielded in accordance with the stop shape formed as curved portions 4c and 5c of the blade members 4 and overlap each other, so the aperture area changes.

Figure 3A:
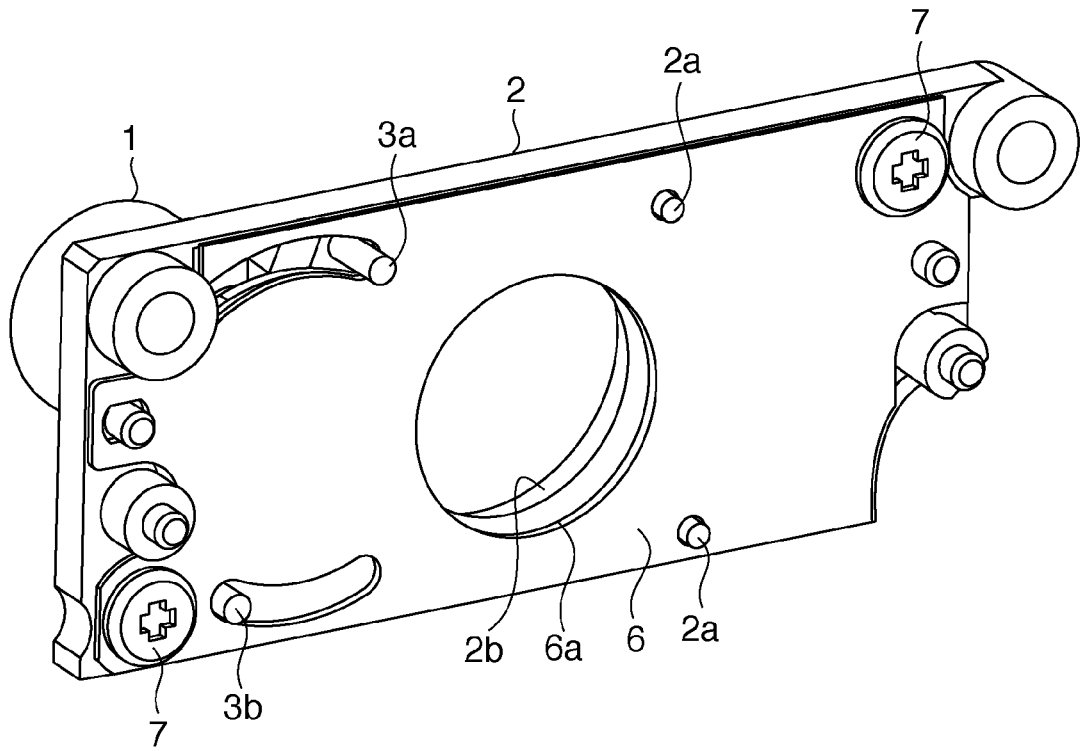
FIGS. 3A and 3B are perspective views showing the shutter apparatus to which the cover is attached in the embodiment.
Figure 3B:
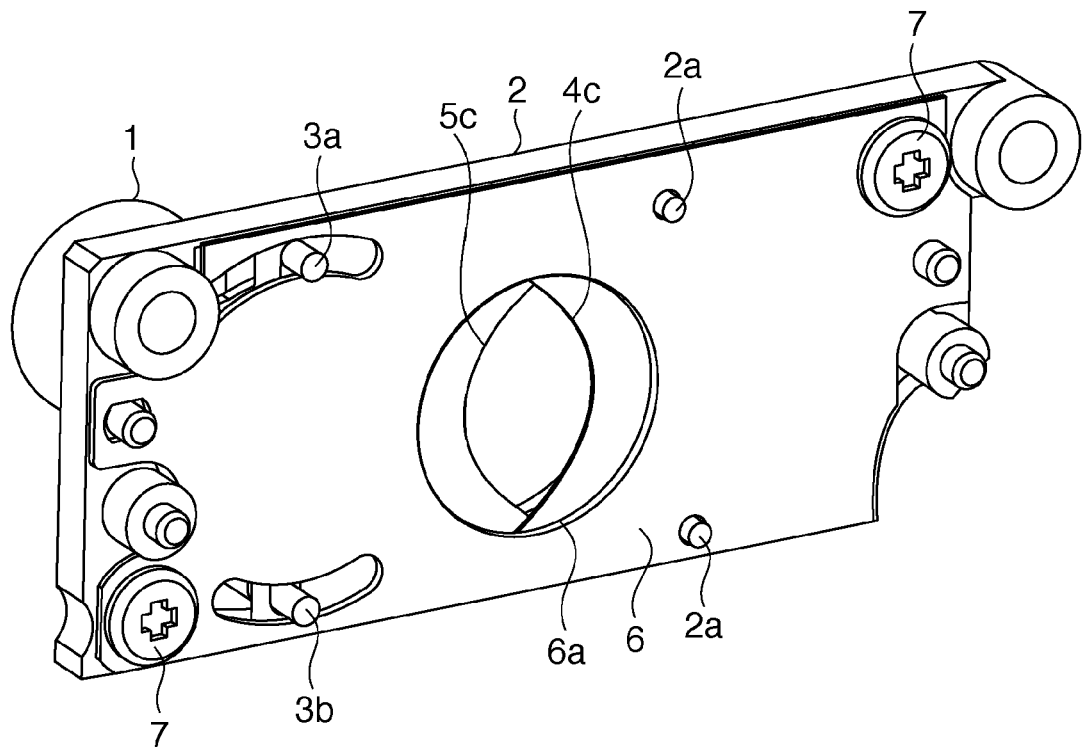

The aperture area of the stop can be controlled to a desired value by controlling the rotational phase of the arm 3 by pivoting the stepping motor 1 (see FIG. 3B).

Figure 2A:
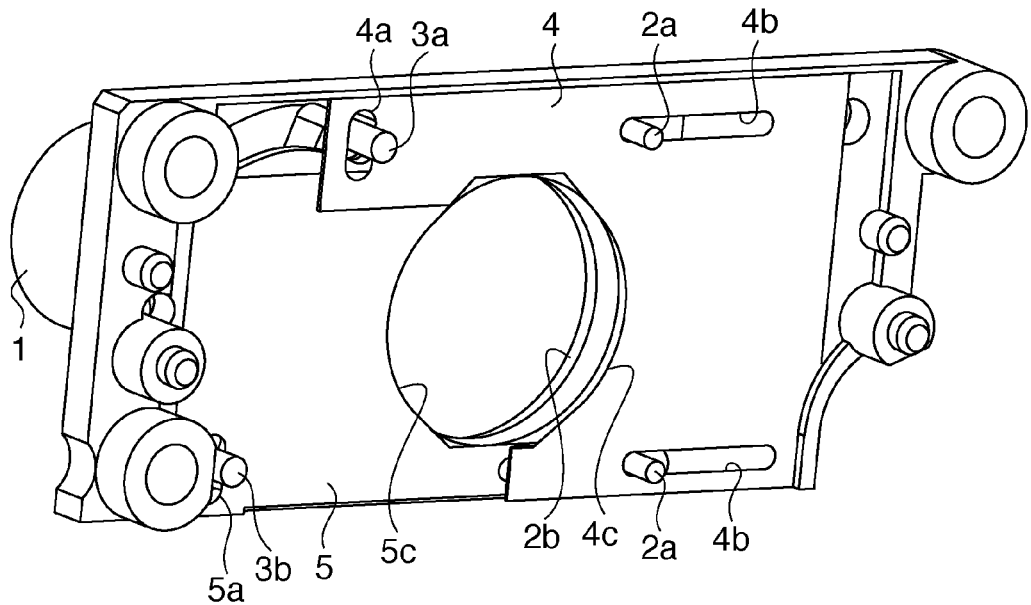
FIGS. 2A and 2B are perspective views showing the shutter apparatus from which a cover is detached in the embodiment.

As shown in FIGS. 2A and 3A, when the arm 3 rotates clockwise with respect to the paper surfaces of FIGS. 2A and 3A and then lies at a position of step 0, at which the shaft 3a is at the right end and the shaft 3b is at the left end (opening stopper), the aperture area maximizes, thereby setting an open (fully open) state. The relationship between the number of steps of the stepping motor 1 and the aperture area as in this case will be described in detail later. The maximum aperture area is set larger than the area of the opening 6a, so the full-aperture diameter of the stop is determined by the area of the opening 6a. Although the area of an opening 2b is set larger than that of the opening 6a so that the full-aperture diameter is defined by the opening 6a in this embodiment, the area of the opening 2b may be set smaller than that of the opening 6a so that the full-aperture diameter is defined by the opening 2b. Alternatively, the full-aperture diameter may be defined by both the openings 2b and 6a.

Figure 2B:
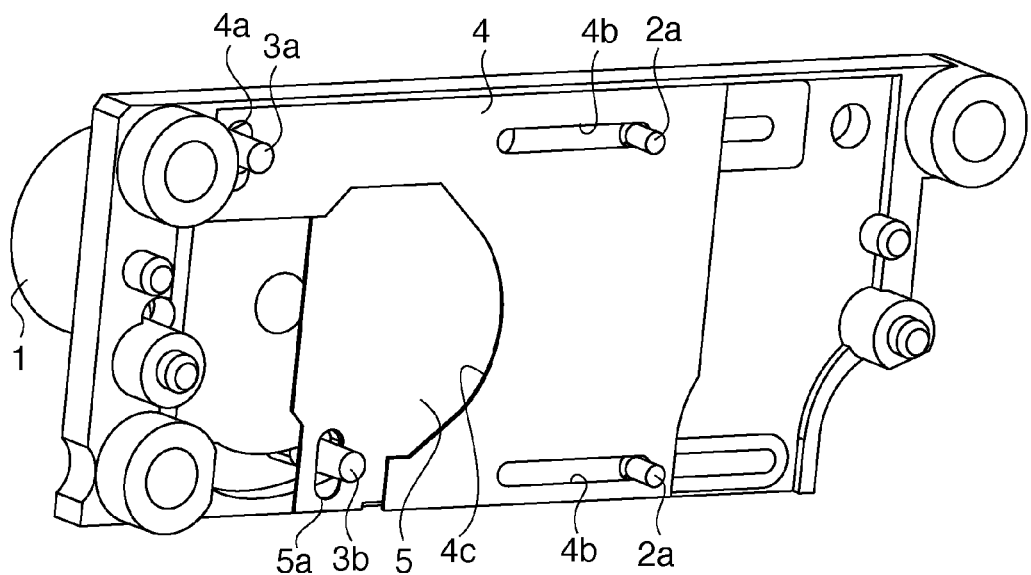

When the arm 3 rotates counterclockwise with respect to the paper surfaces of FIGS. 2A and 3A and then lies at a position of step 8, at which the shaft 3a is at the left end and the shaft 3b is at the right end (closing stopper), the opening 6a is completely sealed by overlapping of the curved portions 4c and 5c, thereby setting a fully closed state, as shown in FIG. 2B.

As described above, a stop function is implemented by controlling the aperture area using the two blade members 4 and 5, and a shutter function is implemented by fully opening or fully closing the opening 6a.

Figures 4A, 4B:
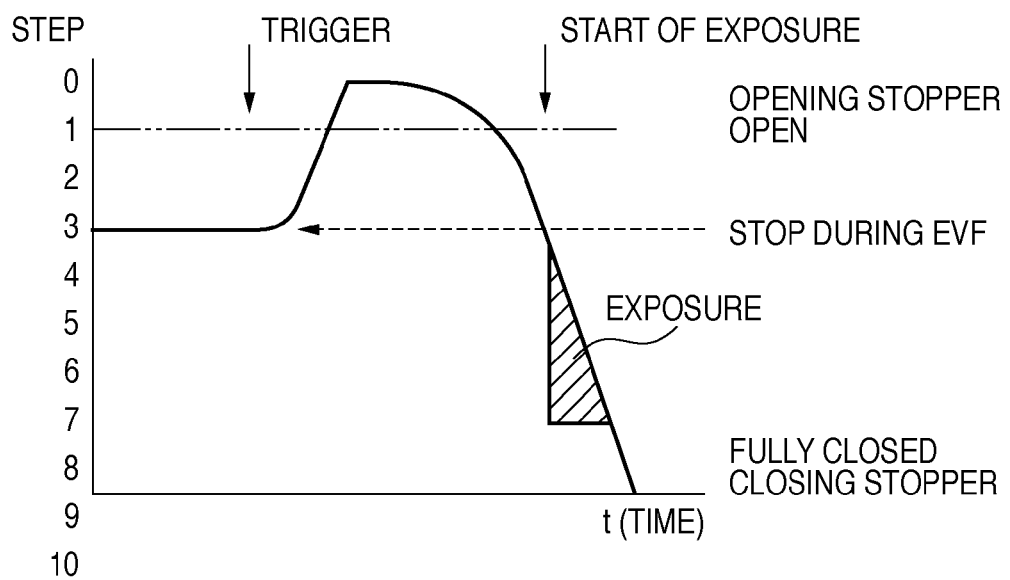
FIGS. 4A and 4B are a table and a timing chart for explaining the driving state of a stepping motor for driving the shutter apparatus in the embodiment.

The driving state of the stepping motor 1 will be described next with reference to FIGS. 4A and 4B. FIG. 4A illustrates the number of steps (STEP) of the stepping motor 1, the phase (PHASE), the status (STATUS), the F-number of the stop, and the opening/closing position. The step shown in FIG. 4A corresponds to single- and two-phase driving described in the phase. Note that micro-step driving of the stepping motor 1 makes it possible to rotate the arm 3 even through angles other than those corresponding to specific phase positions such as single- and two-phase positions. Hence, the stop aperture area can be freely controlled to a halfway position between individual steps at a resolution corresponding not only to the number of steps for each phase but also to the number of divisions of micro-step driving. Micro-step driving is done by converting a rectangular wave corresponding to one period of a pulse sent to the stepping motor into a sinusoidal wave, and dividing the sinusoidal wave by the number of divisions to obtain smaller pulses.

FIG. 4B schematically shows the operation of the stepping motor 1 at the time of shooting. The ordinate in FIG. 4B indicates the number of steps of the stepping motor 1 and corresponds to the stop aperture area. That is, the stop aperture area increases in the positive direction on the ordinate, based on the correspondence shown in FIG. 4A. The abscissa in FIG. 4B indicates time t.

The exposure amount is determined by the value obtained by integrating the aperture area shown in FIG. 4B with respect to time t, that is, the integrated value of the area during the period from when exposure starts until the opening 6a is closed. The shorter the time from when exposure starts until the blade members 4 and 5 fully close the opening 6a, and the faster the speed at which the blade members 4 and 5 are closed, the better to increase the shutter speed. To achieve this, it is desirable to prevent a curved portion which describes the characteristics of the blade members 4 and 5 at the start of movement from falling within the exposure time as much as possible.

FIG. 4B shows control for performing the closing operation of the blade members 4 and 5 after temporarily performing their opening operation at the start of exposure. With such control, it is possible to prevent a curved portion which describes the characteristics of the blade members 4 and 5 at the start of movement from falling within the exposure time, thus achieving a fast shutter speed.

[Control Sequence]

Figure 5:
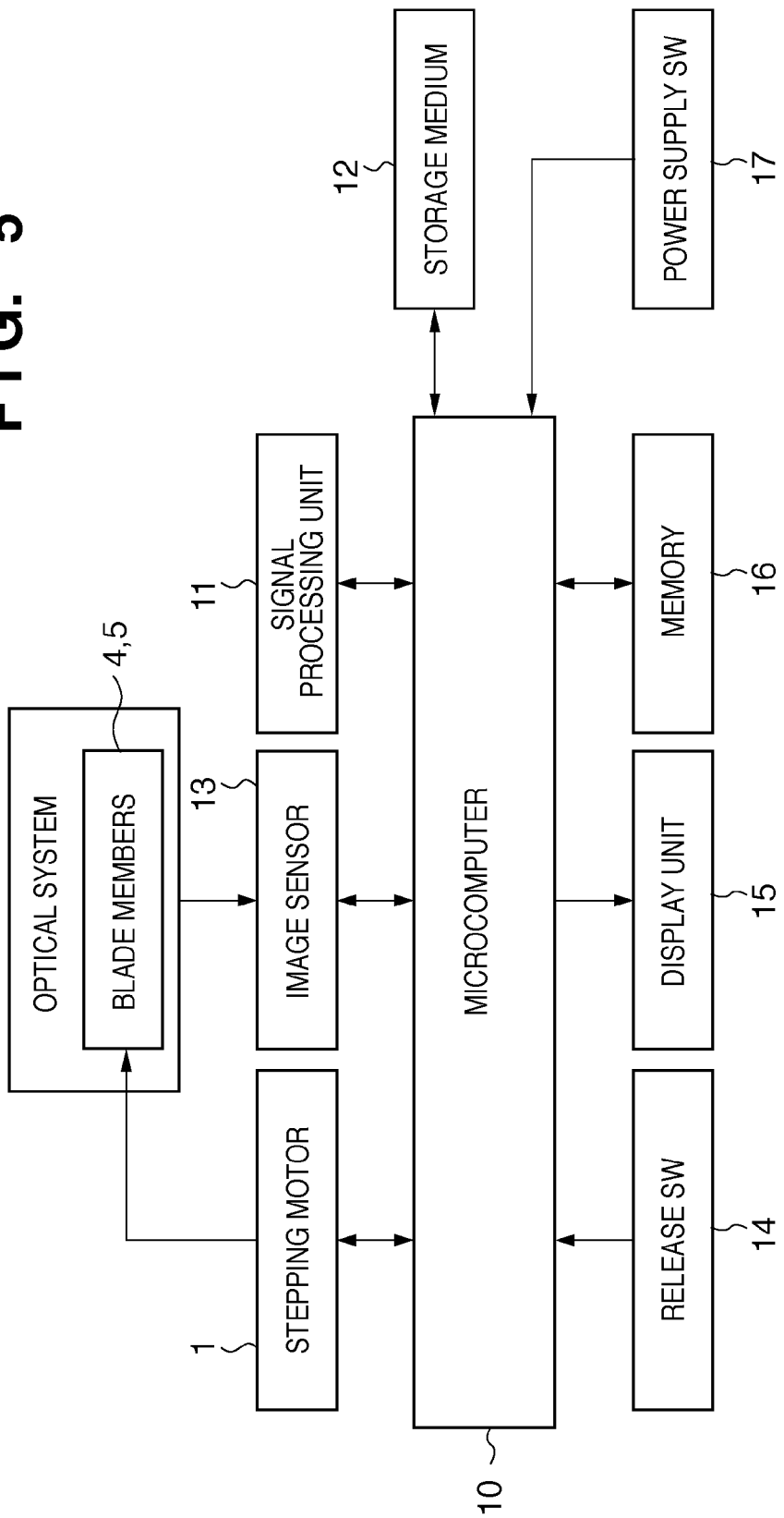
FIG. 5 is a block diagram of an image sensing apparatus including the shutter apparatus in the embodiment.
Figure 6A:
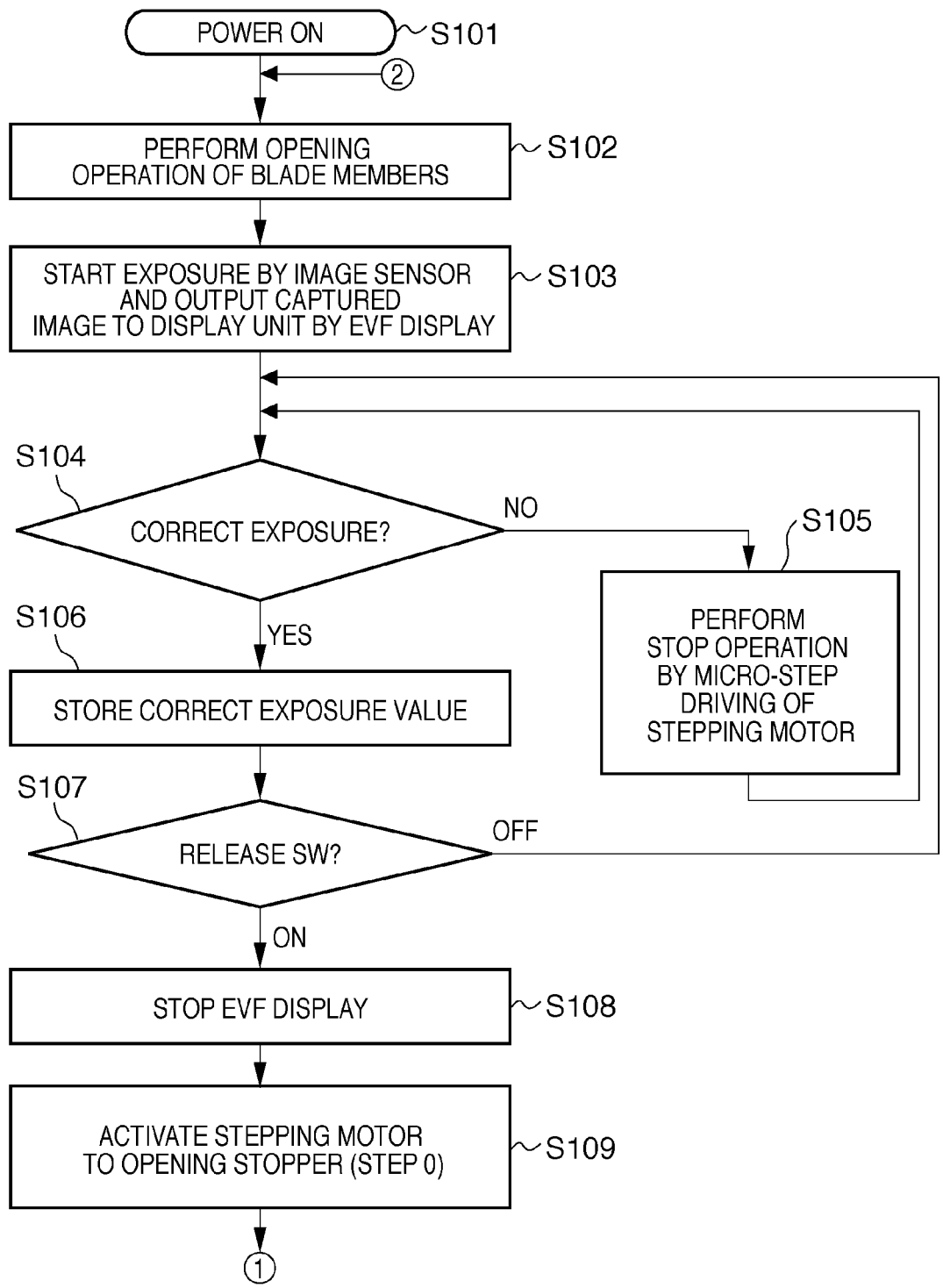
Figure 7A:
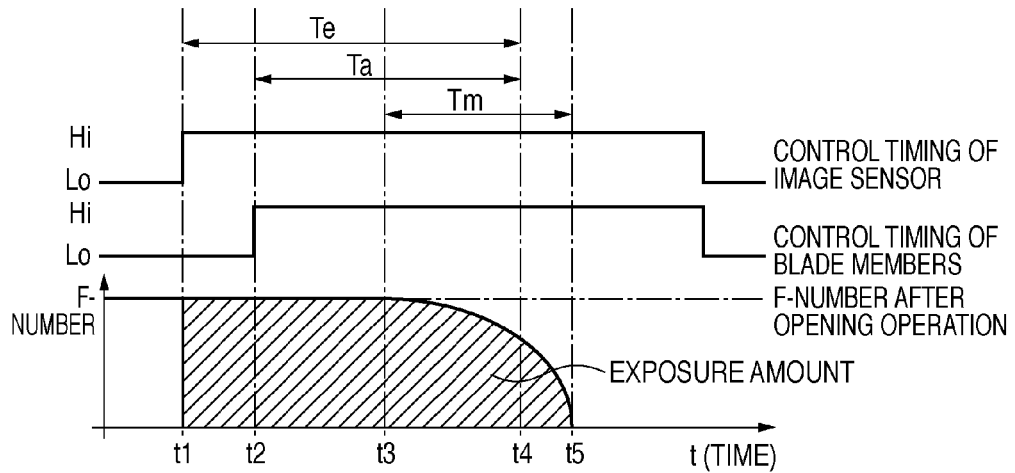
FIGS. 7A and 7B are timing charts showing the control timings of an image sensor and the shutter apparatus in the embodiment.
Figure 7B:
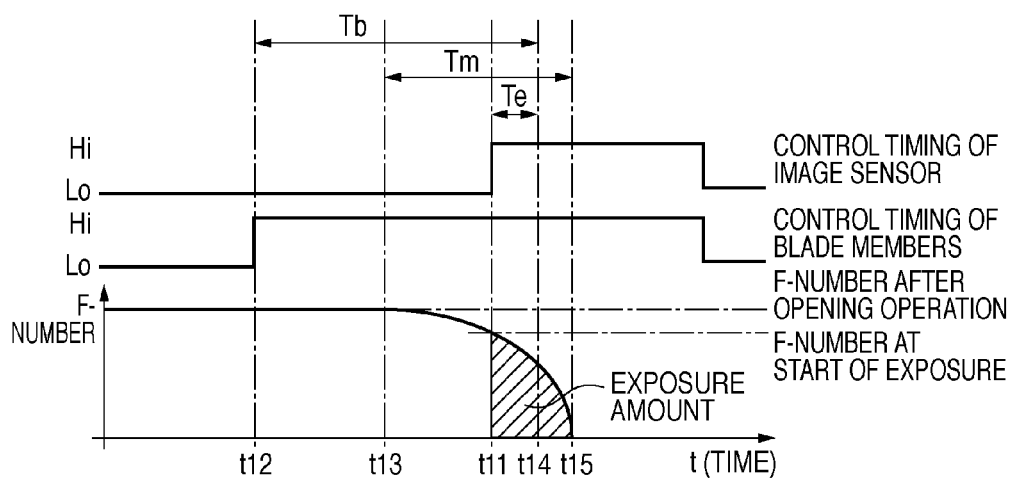
Figure 8A:
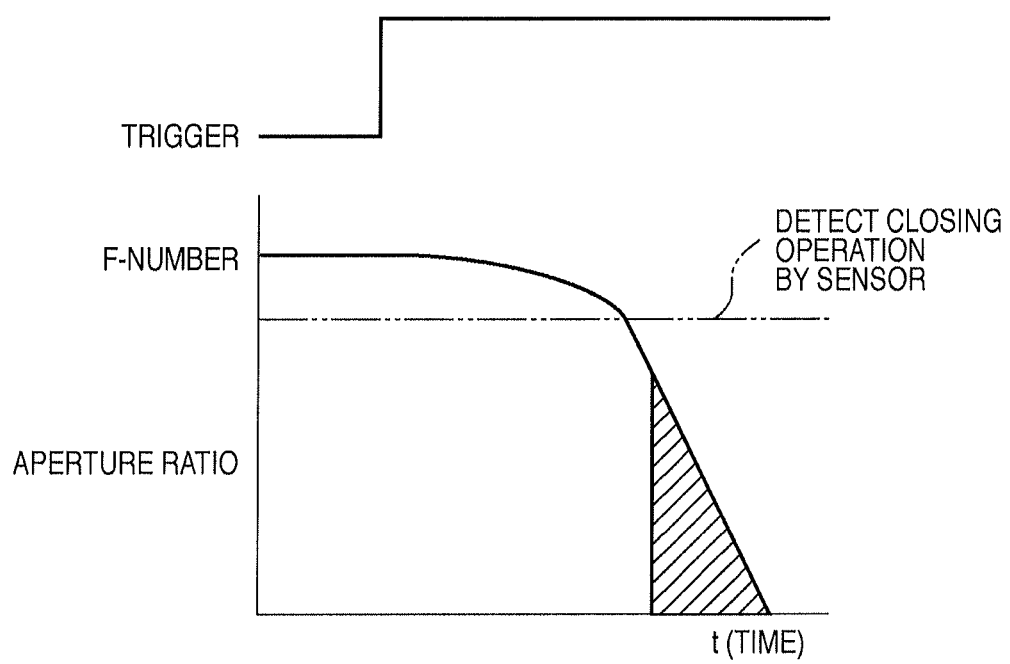
FIGS. 8A and 8B are timing charts showing the operation of the conventional shutter apparatus at the time of shooting.
Figure 8B:
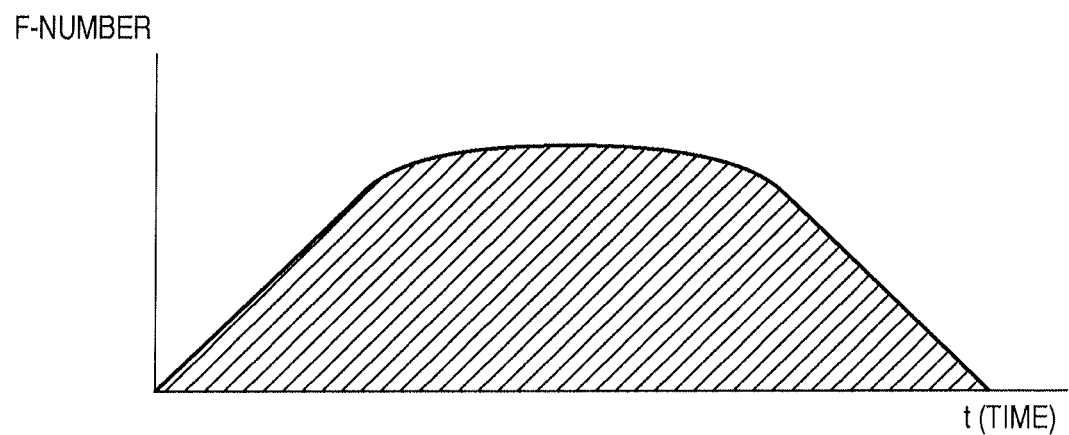

The control configuration and shooting operation of an image sensing apparatus including a shutter apparatus equipped with a stop function in this embodiment will be described with reference to FIGS. 5 to 7A and 7B. Note that FIG. 5 is a block diagram of an image sensing apparatus including the aforementioned shutter apparatus equipped with a stop function, and FIGS. 6A and 6B are flowcharts showing the shooting operation of the image sensing apparatus. Also, FIGS. 7A and 7B are timing charts showing the control timings of the image sensor and shutter apparatus at the time of shooting of the image sensing apparatus. An operation to be described hereinafter is implemented when a microcomputer 10 of the image sensing apparatus loads a firmware program from a ROM into a RAM upon power-on and executes this program, unless otherwise specified.

Referring to FIGS. 5, 6A and 6B, the program starts upon turn-on of a power supply switch 17 (S101), and the stepping motor 1 is driven to perform the opening operation of the blade members 4 and 5 so as to reach a first position (S102). Exposure which uses an image sensor 13 starts, and a captured image based on image capturing signals of an object, which are sequentially obtained at once, is displayed on a display unit 15 (S103). A function of displaying, on the display unit 15, a captured image based on image capturing signals sequentially obtained by exposure which uses the image sensor 13 is called an EVF (Electronic ViewFinder) or a live view and is commonly used.

Photometry of the object is performed using a photometric sensor (not shown) or based on the aforementioned image capturing signals to determine whether correct exposure is attained (S104). If correct exposure is not attained, the stepping motor 1 is moved by micro-step driving (S105), and it is determined again using the blade members 4 and 5 whether correct exposure is attained. After this process is repeated until it is determined that correct exposure is attained, the F-number and shutter speed at the time of still image shooting are calculated from the correct exposure value and stored in a memory 16 (S106). Note that micro-step driving is done in step S105 to enhance the resolution by the amount of increase or decrease in aperture ratio (aperture area) per unit driving operation, as described previously.

Referring to FIG. 4B, the image sensing apparatus is in an EVF mode upon issuing a shooting operation start instruction (upon triggering), and the aperture diameter is stopped down to step 3. A shooting operation start instruction (triggering) is done by determining whether a release switch 14 provided in the image sensing apparatus is ON/OFF (S107). If the release switch 14 is OFF, the process returns to step S104, in which correct exposure determination is performed. If the release switch 14 is ON, a shooting operation start instruction is done to stop EVF display (S108). To stop EVF display, the display of the display unit 15 may be blacked out or the captured image immediately before the stop of EVF display may continue to be displayed.

A pulse is sent to the stepping motor 1 until a phase corresponding to step 0 is reached, and the blade members 4 and 5 are temporarily activated to the opening stopper (a fully opening position shown in FIGS. 2A and 3A) (S109). The stepping motor 1 moves by micro-step driving until step S109. This is to prevent, for example, step-out and reversal of the stepping motor 1 by smoothly starting its movement because in an EVF mode, the stop is at a position to which it is driven by micro-step driving and from which it is to be moved.

Exposure start timings t1 and t11 and shutter driving start timings t2 and t12 in FIGS. 7A and 7B are calculated from the shutter speed stored in step S106. Note that the shutter driving start timing means herein the timing at which the closing operation of the two blade members 4 and 5 starts, and a control signal used to start the closing operation of the two blade members 4 and 5 will be referred to as a shutter driving trigger hereinafter.

First, the curtain speed time Tm of the blade members 4 and 5, that is defined from the timing (t3 or t13) at which the blade members 4 and 5 start to shield the opening 6a against light until the timing (t5 or t15) at which the opening 6a assumes a fully closed state, and the shooting exposure time (shutter speed) Te are compared (S110).

If the shooting exposure time Te is longer than the curtain speed time Tm, first control is used to compensate for a shift in exposure amount based on the delay operation of the blade members 4 and 5 during the period from when a shutter driving trigger is generated until the opening 6a assumes a fully closed state (S111).

Referring to FIG. 7A, the exposure time Ta obtained by converting the exposure amount during the period from timing t2 at which a shutter driving trigger is generated until timing t5 at which the opening 6a assumes a fully closed state into the exposure time when the F-number remains constant at its initial value is determined as a correction amount in first control. When the time point the shooting exposure time Te after exposure start timing t1 of the image sensor 13 is defined as timing t4, a desired exposure amount is attained by generating a shutter driving trigger at timing t2 that is the time Ta earlier than timing t4.

On the other hand, if the exposure time Te is equal to or shorter than the curtain speed time Tm, exposure starts during the closing operation of the blade members 4 and 5, so second control is used in consideration of the F-number at exposure start timing t11 of the image sensor 13 (S114).

Referring to FIG. 7B, the exposure time obtained by converting the exposure amount during the period from exposure start timing t11 of the image sensor 13 until timing t15 at which the opening 6a assumes a fully closed state into the exposure time when the F-number stays constant after timing t11 is defined as the exposure time Te, and the time point the exposure time Te after timing t11 is defined as timing t14. The time Tb from timing t12 at which a shutter driving trigger is generated until timing t14 is determined as a correction amount in second control. The correction amount Tb is an amount (second correction amount) obtained by correcting the difference between time points t4 and t14 with respect to the correction amount Ta (first correction amount) in first control.

Note that in first control, the correction amount Ta is stored in the memory for each F-number, and the shutter driving start timing is corrected using the correction amount Ta corresponding to the F-number after an opening operation. Note also that in second control, the correction amount Tb which takes into consideration the shift between timings t4 and t14, that changes depending on the F-number at the start of exposure, is stored in the memory for each exposure time, and the shutter driving start timing is corrected using the correction amount Tb corresponding to the shutter speed stored in step S106.

If the shooting exposure time Te is longer than the curtain speed time Tm, exposure starts before starting the closing operation of the blade members 4 and 5, as described earlier (S112).

After that, a pulse is sent to the stepping motor 1 so as to make a transition from step 0 to step 1 to activate the blade members 4 and 5 in the closing direction. At this time, the stepping motor 1 is reversed by single- and two-phase driving (S113).

If the shooting exposure time Te is equal to or shorter than the curtain speed time Tm, a pulse is sent to the stepping motor 1 so as to make a transition from step 0 to step 1 to activate the blade members 4 and 5 in the closing direction. At this time, the stepping motor 1 is reversed by single- and two-phase driving (S115).

Pulses are sequentially sent to the stepping motor 1 so as to make transitions from step 1 to perform the closing operation of the blade members 4 and 5, and the charge on the image sensor 13 is reset in the course of the closing operation, and exposure starts (S116). Note that if the shooting exposure time Te is equal to the curtain speed time Tm, exposure starts simultaneously with the start of the closing operation of the blade members 4 and 5.

Pulses are sent to the stepping motor 1 so as to make transitions to step 8 to activate the blade members 4 and 5 until they reach the closing stopper (the fully closing position shown in FIG. 2B) (S117).

Pulses are sent to the stepping motor 1 so as to make transitions to step 10 to end the driving of the stepping motor 1 (S118). This is done because the blade members 4 and 5 may collide with the closing stopper and rebound upon stopping power supply to the stepping motor 1 immediately after pulses are sent to it to make transitions to step 8, and thus a gap may be formed between the blade members 4 and 5 and exposure may be performed gain. As for steps subsequent to step 8, /B and /A/B phase pulses continue to be sent to the stepping motor 1, as in steps 9 and 10 shown in FIG. 4A, so a torque acts to further rotate the stepping motor 1 toward the closing side even after the blade members 4 and 5 collide with the stopper in step 8. This torque is canceled by a torque which acts to reverse the stepping motor 1 upon a rebound of the blade members 4 and 5, thus making it possible to prevent the rebound.

When a fully closed state is set, exposure ends (S119), and an image capturing signal from the image sensor 13 is transferred to a signal processing unit 11 of the image sensing apparatus, and stored in a storage medium 12 such as a memory card as still image data.

After that, the process returns to step S102, in which the blade members 4 and 5 are opened.

As has been described above, the curtain speed of the blade members 4 and 5 can be raised until the start of exposure after the start of this closing operation by performing the closing operation of the blade members 4 and 5 after temporarily activating them to the opening position thus making it possible to increase the curtain speed of the blade members 4 and 5 at the start of exposure. This makes it possible to increase the shutter speed without using a sensor which detects the closing operation of the blade members.

Also, appropriate exposure control can be done irrespective of the exposure time by comparing the exposure time at the time of shooting with the curtain speed time of the blade members 4 and 5 and selectively using first control and second control for the exposure start timing and the shutter control timing.

According to this embodiment, a shutter apparatus equipped with a stop function is implemented by using the stepping motor 1 which can stop in the course of operation as an actuator for driving the blade members 4 and 5. Also, the blade members 4 and 5 are driven by a run-up distance from the opening position after temporarily moving them to the opening position, and exposure starts in the course of driving, so the speed of the blade members 4 and 5 at the start of exposure rises, thus making it possible to increase the shutter speed.

On the other hand, the aperture area can be controlled at a resolution higher than that of the phase of single- and two-phase driving by moving the stepping motor 1 by micro-step driving.

Although the display unit 15 performs EVF display of an image capturing signal when the stop is controlled by micro-step driving in this embodiment, the display method is not limited to EVF display, and the stop may be controlled by micro-step driving during moving image recording.

As in this embodiment, the blade members 4 and 5 serve both as a stop and a shutter, so components (blade members) of a stop and shutter are shared, thus making it possible to decrease the number of components (the number of blade members).

Although the stepping motor 1 is activated by single- and two-phase driving after temporarily moving the blade members 4 and 5 to the opening position in this embodiment, the present invention is not limited to this, and the closing operation of the blade members 4 and 5 may be performed by two-phase driving.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-164353, filed Jul. 21, 2010, which is hereby incorporated by reference herein in its entirety.

What is claimed is:

1. A shutter apparatus mounted in an image sensing apparatus, the shutter apparatus comprising:
    a blade member configured to open/close an opening through which light from an object passes, and control an aperture area of the opening; and
    a driving unit capable of first and second driving controls, wherein said first driving control drives said blade member to serve as a stop, and said second driving control drives said blade member to serve as a shutter,
    wherein when an image capturing is started in a state that the blade member is driven as the stop to a first position in a closing direction, said driving unit temporarily drives said blade member in an opening direction from the first position and then activates said blade member to a fully closing position.

2. The apparatus according to claim 1, wherein said blade member is driven by the first driving control from the first position to an opening position, and said blade member is driven by the second driving control from the opening position to the fully closing position.

3. The apparatus according to claim 1, wherein a position at which said blade member is stopped upon driving said blade member in the opening direction includes a position to which said blade member is driven in the opening direction from a position at which the aperture area of the opening maximizes.

4. The apparatus according to claim 1, wherein
said driving unit includes a stepping motor, and
in the first driving control, micro-step driving is performed using pulses obtained by dividing a pulse corresponding to one period for use in the second driving control.

5. An image sensing apparatus comprising:
an image sensing unit;
a blade member configured to open/close an opening through which light that enters said image sensing unit passes, and control an aperture area of the opening;
a driving unit capable of first and second driving controls, wherein said first driving control drives said blade member to serve as a stop, and said second driving control drives said blade member to serve as a shutter; and
a control unit configured to control said driving unit and said image sensing unit,
wherein when an object is captured by said image sensing unit, said control unit starts exposure of said image sensing unit during a period from when said blade member starts to be driven in a closing direction after temporarily driving said blade member in an opening direction from a first position to which said blade member is driven in the closing direction to serve as a stop until said blade member reaches a fully closing position.

6. The apparatus according to claim 5, wherein said control unit
performs correction of a timing at which an instruction to start a closing operation of said blade member is issued to compensate for a shift in exposure amount based on the closing operation of said blade member,
performs the correction using a correction amount based on an F-number used when exposure of said image sensing unit starts, if exposure of said image sensing unit starts during a period from when said blade member starts to be driven in the closing direction until said blade member reaches a fully closing position, and
performs the correction using a correction amount based on an F-number used when said blade member is temporarily opened before a closing operation, if exposure of said image sensing unit starts before said blade member starts to be driven in the closing direction.

7. A shutter control method for a shutter apparatus including a blade member configured to open/close an opening through which light from an object passes, and control an aperture area of the opening, and a driving unit capable of first and second driving controls, wherein the first driving control drives the blade member to serve as a stop, and the second driving control drives the blade member to serve as a shutter, the method comprising:
when an image capturing is started in a state that the blade member is driven as the stop to a first position in a closing direction, temporarily driving the blade member in an opening direction from a first position and then activating the blade member to a fully closing position.

8. A control method of an image sensing apparatus including an image sensing unit, a blade member configured to open/close an opening through which light that enters said image sensing unit passes, and control an aperture area of the opening, and a driving unit capable of first and second driving controls, wherein said first driving control drives said blade member to serve as a stop, and said second driving control drives said blade member to serve as a shutter, the method comprising:
when an object is captured by said image sensing unit, controlling to start exposure of said image sensing unit during a period from when said blade member starts to be driven in a closing direction after temporarily driving said blade member in an opening direction from a first position to which said blade member is driven in the closing direction to serve as a stop until said blade member reaches a fully closing position.

* * * * *